Nov. 17, 1959
H. F. SEMRAU
2,912,762
DIAL PROTRACTORS
Filed Nov. 4, 1957
3 Sheets-Sheet 1
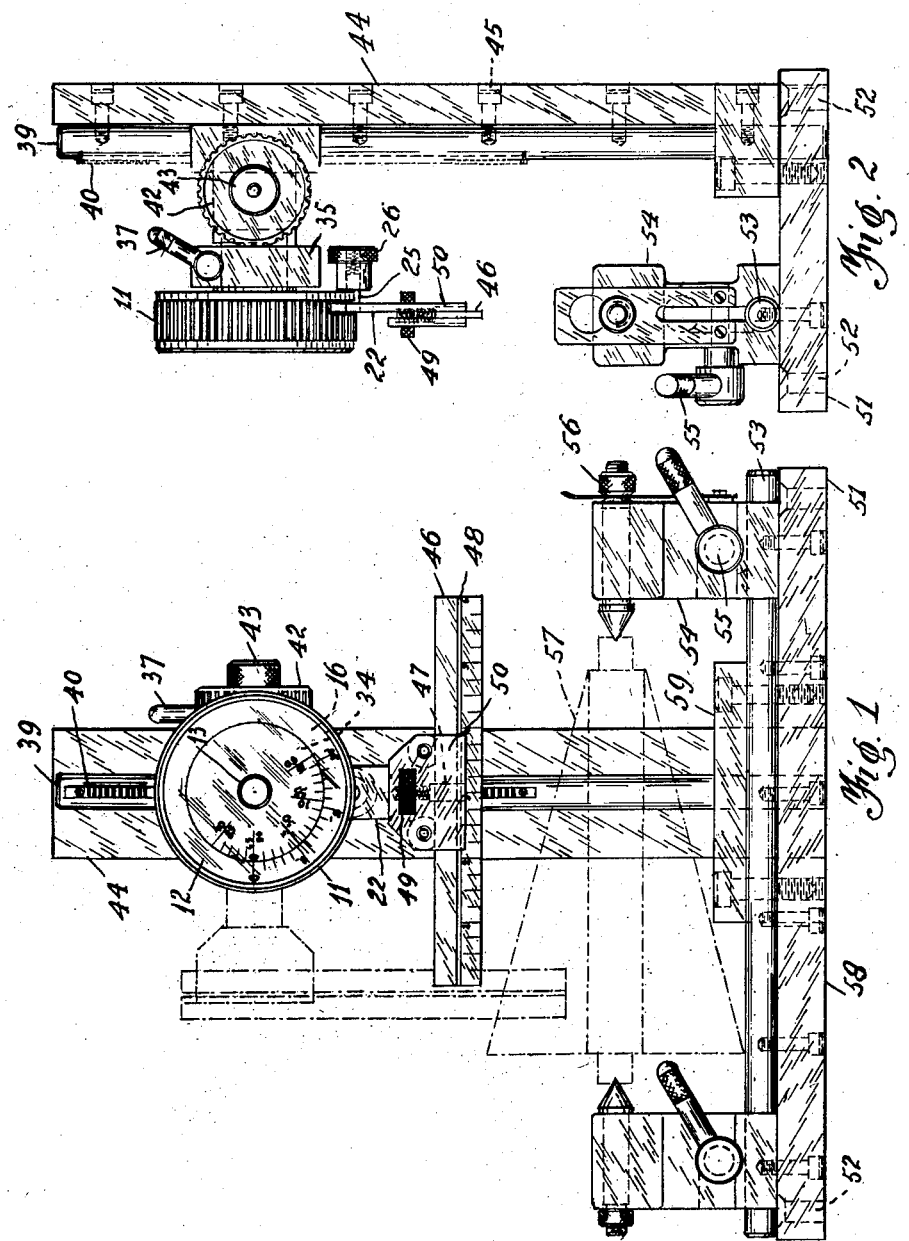

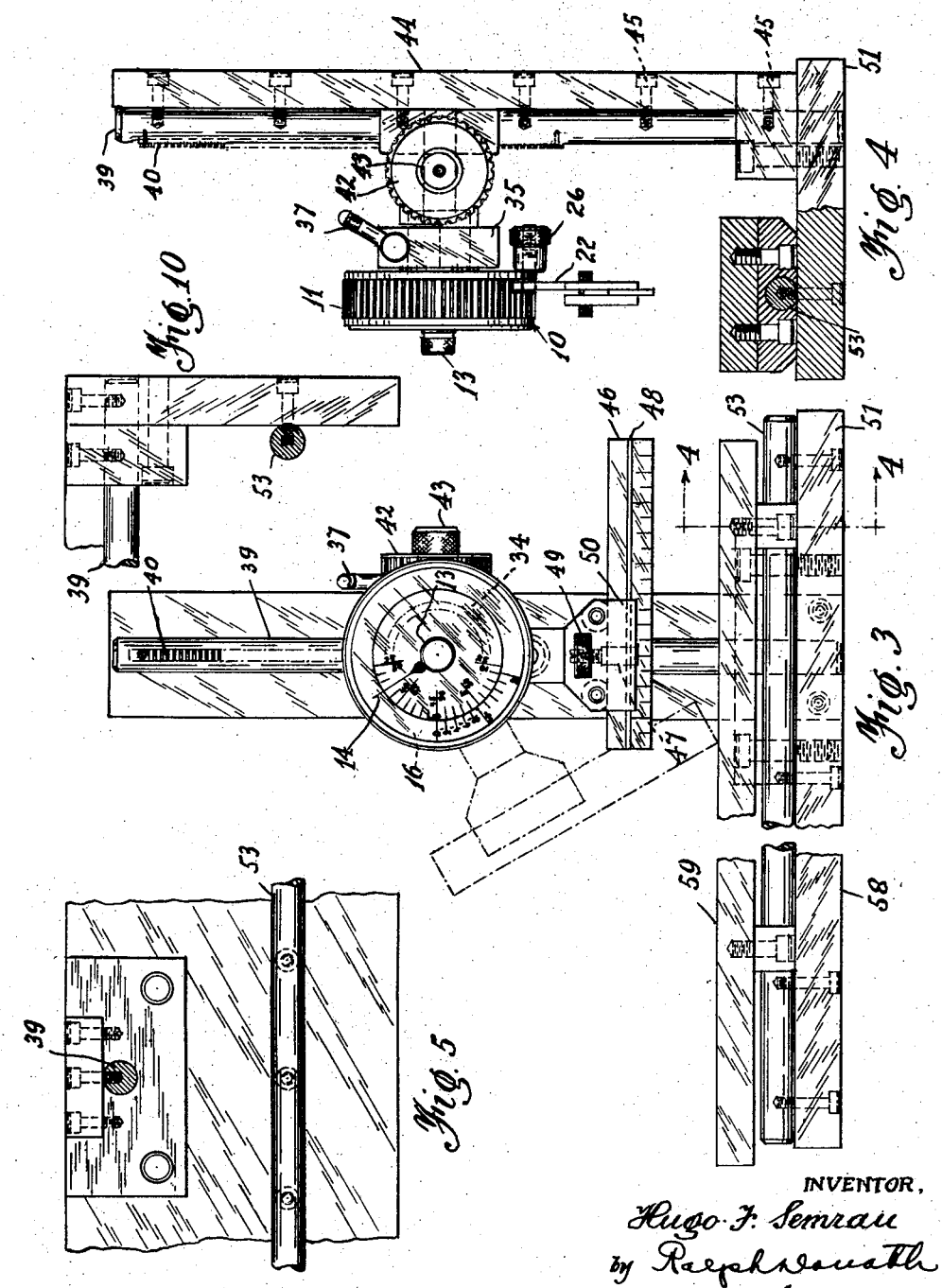

Nov. 17, 1959     H. F. SEMRAU     2,912,762
DIAL PROTRACTORS
Filed Nov. 4, 1957     3 Sheets-Sheet 3
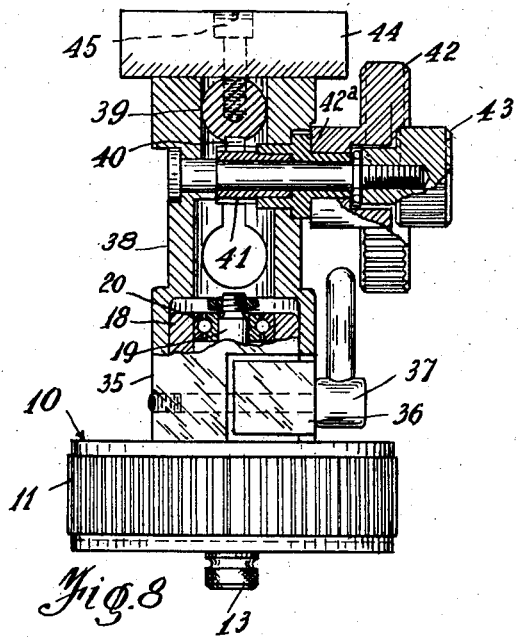
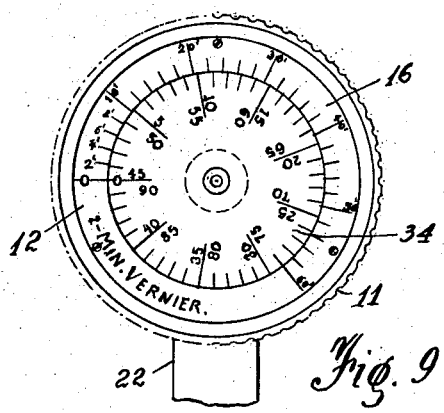
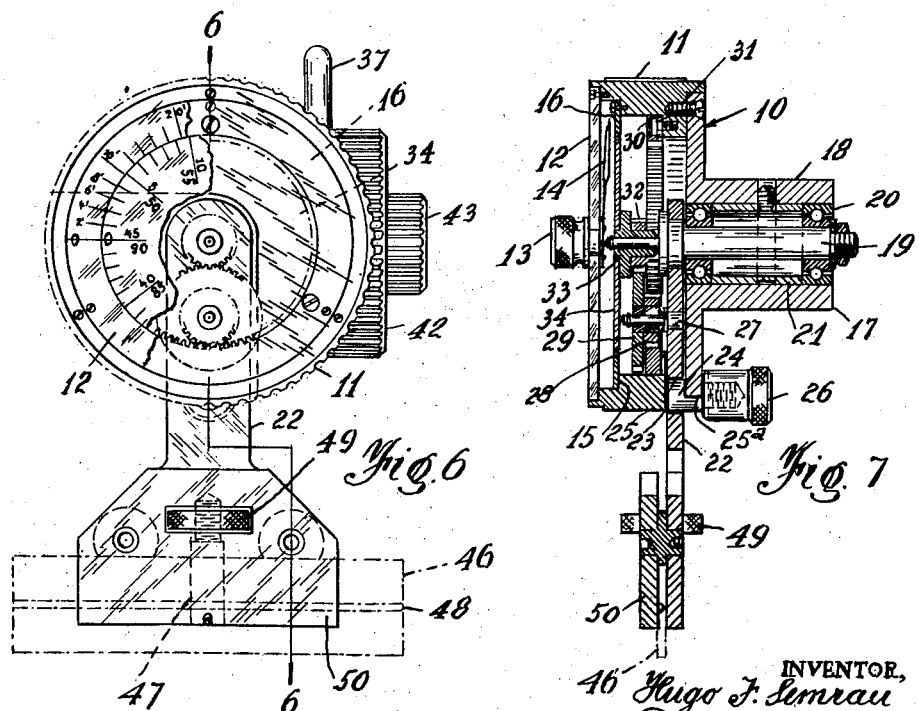
INVENTOR,
Hugo F. Semrau
by Ralph Semrau
Attorney ated Nov. 17, 1959

2,912,762

DIAL PROTRACTORS

Hugo F. Semrau, Verona, Pa.

Application November 4, 1957, Serial No. 694,300

3 Claims. (Cl. 33—75)

This invention relates to improvements in protractors and particularly to improvements in dial protractors for accurately measuring or laying out angles of work.

It is an object of the present invention to provide an accurate, easily set and easily read dial protractor for making angular measurements.

It is another object of the present invention to provide a dial protractor which may be used with various conventional instruments for measuring angular inclinations and positions.

It is a further object of the present invention to provide a dial protractor assembly for holding an object between centers while determining accurately its angular dimensions.

It is still another object to provide a dial protractor assembly for holding an object on a plane base surface while accurately determining its angular dimensions.

Other objects, advantages and purposes of this invention will be apparent from a consideration of the following description and the accompanying drawings in which:

Figure 1 is a front elevation of one form of this invention for measuring an object held between centers.

Figure 2 is a side elevation of the invention of Figure 1.

Figure 3 is a front elevation of a second embodiment of this invention for measuring an object held on a planar surface.

Figure 4 is a side elevation partly in section of the embodiment of Figure 3, on line 4—4 thereof.

Figure 5 is an enlarged segmental plan of the base of Figure 3.

Figure 6 is an enlarged front elevation of the protractor head of Figures 1–4.

Figure 7 is a section on the line 6—6 of Figure 6.

Figure 8 is a top plan view partly cut away of the protractor head of Figure 6.

Figure 9 is a plan view of the protractor head dial showing the measuring vernier.

Figure 10 is a side view of Figure 5.

Referring to the drawings there is illustrated a housing 10 of cylindrical form having knurling 11 about its outer periphery. The front of housing 10 is closed by a transparent face 12 of glass or plastic through which is fixed a knurled knob 13 lying on the axis of the cylinder and carrying a pointer 14. Spaced inwardly from the face 12 and fixed to a shoulder 15 on the housing 10 is an annular dial 16. The rear of housing 10 is closed by an annular member 17 having a hollow cylindrical shaft 18 projecting therefrom axially of housing 10. An inner coaxial shaft 19 is journaled in ball bearings 20 held spaced apart adjacent the ends of shaft 18 by a spacer 21. A measuring edge arm 22 is fitted to the shaft 19 and extends through a slot 23 in the periphery of housing 10. A locking pin 24 is mounted in an opening 25 in arm 22. Locking pin 24 is provided with a slot 25a adapted to slidably engage the edge of annular member 17 adjacent slot 23 and a locking nut 26 threaded thereon to lock the pin 24 against the edge of annular member 17 and thereby hold arm 22 fixed in any selected position.

A stub shaft 27 is fixed in arm 22 intermediate the shaft 19 and locking pin 24. The shaft 27 carries a small pinion 28 and a large pinion 29 fixed to rotate in unison. The small pinion 28 engages a ring gear 30 fixed to a shoulder 31 spaced from the annular member 17. The larger pinion 29 engages a pinion 32 journaled on a stub shaft 33 on the end of shaft 19 and coaxial therewith. A dial 34 is mounted on pinion 32 for rotation therewith. The hollow shaft 18 is mounted in a collar 35 provided with a locking member 36 and lock nut 37. The collar 35 is mounted on a slide block 38 adapted to be slidable vertically on a shaft 39. The shaft 39 is provided with a rack 40 adapted to be engaged by a pinion 41 journaled on stub shaft 42a in slide block 38. The pinion 41 is actuated by hand wheels 42 and 43. The shaft 39 is preferably mounted on a vertical upright 44 by cap screw 45. A measuring blade 46 is mounted on a locking pin 47 by means of a locking slot 48 and pin engageable thereon. The measuring blade is locked by tightening the nut 49 in carrier 50 on the end of measuring edge arm 22.

In the embodiment shown in Figures 1 and 2 the vertical upright 44 is fixed at its lower extremity to a base plate 51 which may be fastened to a bench (not shown) by inserting screws through holes 52. A slide bar 53 is fixed centrally of the base-plate 51 in the plane of the measuring blade 46. A pair of center blocks 54 are mounted for movement on slide bar 53. Locking screws 55 are provided to hold the center blocks 54 in selected position. Each center block 54 is provided with a center pin 56 adapted to hold work 57 between them.

When it is desired to determine an angle on the work 57 the measuring blade 46 is brought into position by rotating the arm 22. Rotation of the arm 22 causes a simultaneous rotation of the gear train 28, 29 and 32 in the ring gear 30 and thereby a relative rotation of dial 34 with respect to annular dial 16. The angular position of blade 46 is read from the dial 34.

In the embodiment shown in Figures 3, 4 and 5 a surface plate 58 is mounted on runners 59 adapted to slidably engage the slide bar 53. Measurements are made in a manner similar to that described above in respect of the embodiment of Figures 1 and 2.

While certain preferred embodiments of this invention have been illustrated and described, it will be understood that the invention may be otherwise embodied within the scope of the following claims.

I claim:

1. A dial protractor comprising, a base, adjustable work-holding means on said base, a vertically-extending support member on said base, a rack gear on said support member, a gear housing having a pinion cooperatively engaging said rack gear to adjustably position said housing on said support member, a ring gear having inwardly-directed teeth fixed to the inner periphery of said housing, an annular closing member secured to a back portion of said housing, a central shaft journaled in said annular member and rotatable in the housing generally axially of the ring gear, a radially-extending arm on said shaft projecting through a slot formed in the housing, a first pinion gear mounted on said radially-extending arm intermediate its ends and cooperatively engaging said ring gear, a second pinion gear mounted on said central shaft, an intermediate gear mounted for rotation on said radial arm co-axially with said first pinion gear and drivingly connecting the pinion gear on the radial arm and the pinion gear on the central shaft in a pre-determined relation, a fixed annular measuring dial on the housing, a circular dial on said second pinion gear rotatable adjacent the annular dial, and a measuring blade slidably held in the end of the radial arm remote from the central shaft for positioning on a work piece held by said adjustable work-holding means.

2. A dial protractor comprising, a base, sliding adjustable work-holding means on the base having a planar surface plate, a gear housing adustably spaced apart from said work-holding means, a support member extending outwardly from said base, a rack gear on said support member, a pinion on said housing cooperably engaging said gear rack to selectively adjust the spatial relation between said gear housing and said base, a ring gear having inwardly-directed teeth fixed to the inner periphery of said housing, an annular member closing off a rear portion of said housing, a hollow cylindrical shaft projecting outwardly from said annular member axially of said housing, a rotatable central shaft journaled in said cylindrical shaft and extending into said housing, a radially-extending arm pivotally connected on said central shaft for rotation in said housing generally radially of the ring gear axis, said arm projecting radially-outwardly through a slot formed in said housing, a pinion gear operatively engaging said ring gear and mounted for rotation on said arm intermediate its ends, an annular dial on said housing, a circular dial in said housing mounted on said central shaft axially of the annular dial for relative rotation therebetween, a gear train operatively connecting said pinion on the radial arm and the circular dial in a pre-determined relation responsive to the rotational movement of said radial arm, and a measuring edge slidably held in an end of the radial arm remote from its pivotal point to engage an annular surface on a work piece retained by said work-holding means.

3. A device as defined in claim 2 wherein a locking pin is mounted in an opening in said radially-extending arm for slidable engagement with an edge of said annular member to thereby hold said arm in a pre-selected position with respect to said housing.

References Cited in the file of this patent

UNITED STATES PATENTS

| | | |
|---|---|---|
| 753,025 | Woodborough | Feb. 23, 1904 |
| 819,339 | Cleland | May 1, 1906 |
| 996,901 | Ball | July 4, 1911 |
| 1,380,945 | Brown | June 7, 1921 |
| 1,498,896 | Van De Veire | June 24, 1924 |
| 1,879,587 | Swain | Sept. 27, 1932 |
| 2,026,006 | Wennerstrom | Dec. 31, 1935 |
| 2,369,477 | Martin | Feb. 13, 1945 |
| 2,495,609 | Semrau | Jan. 24, 1950 |